United States Patent [19]

Lemone et al.

[11] Patent Number: 4,685,057
[45] Date of Patent: Aug. 4, 1987

[54] MEMORY MAPPING SYSTEM

[75] Inventors: Lou Lemone, Stow; Salvatore Faletra, Framingham; John R. McDaniel, Acton; Steve Caldara, Wayland, all of Mass.

[73] Assignee: Data General Corporation, Westboro, Mass.

[21] Appl. No.: 501,205

[22] Filed: Jun. 6, 1983

[51] Int. Cl.⁴ .............................................. G06F 13/00
[52] U.S. Cl. ..................................... 364/200; 364/900
[58] Field of Search ... 364/200 MS File, 900 MS File

[56] References Cited

U.S. PATENT DOCUMENTS

| | | | |
|---|---|---|---|
| 4,228,501 | 10/1980 | Frissell | 364/200 |
| 4,254,463 | 3/1981 | Busby et al. | 364/200 |
| 4,285,040 | 8/1981 | Carlson et al. | 364/200 |
| 4,290,106 | 9/1981 | Catiller et al. | 364/200 |
| 4,319,323 | 3/1982 | Ermolovich et al. | 364/200 |
| 4,488,256 | 12/1984 | Zolnowsky et al. | 364/900 |
| 4,530,049 | 7/1985 | Zee | 364/200 |

OTHER PUBLICATIONS

Donald E. Knuth, The Art of Computer Programming 1968 (pp. 436-450).
Harvey M. Deitel, An Introduction to Operating Systems, 1984, (pp. 157-173).

*Primary Examiner*—Gareth D. Shaw
*Assistant Examiner*—Christina M. Eakman

[57] ABSTRACT

The disclosure relates to a memory mapping system wherein information is stored on a page by page basis in memory in discontiguous locations therein with the address of the next page in which storage is to take place always being available in the controller to minimize delay in storage from the end of one page to the beginning of the following page, regardless of page location in memory. When a user makes a request for storage space in memory, the amount of memory required is determined and the host looks to see where it can obtain that memory. Typically, use of discontiguous memory locations is required. All of the information relative to the addresses of the discontiguous storage locations in memory is provided to the controller by the host computer in a single command rather than after each move to a discontiguous storage location. All jumps to discontiguous storage locations are then performed independent of the host computer.

6 Claims, 10 Drawing Figures

MEMORY MAPPING SYSTEM

BACKGROUND OF THE INVENTION

1. Field of the Invention

This invention relates to storage and retrieval of data from a memory wherein blocks of data which are greater in length than one page can be stored in discontiguous portions of the memory.

2. Description of the Prior Art

In computer systems of the prior art in the event information is to be stored in peripheral memory, the host computer is provided with an indication of the amount of memory required to store the incoming information and proceeds to locate that space in memory by means of system software. Typically, when a controller transfers data between the host computer and any peripheral device, the host provided addresses in peripheral memory which the controller accesses are in sequential order and the system software typically maps the controller's transfers independently of the controller. Often a single block of storage area of sufficient size is not available in the memory in which case the host computer, by means of the system software, will note two or more discontiguous areas in memory for storage of the information therein. In this case, the system software finds a list of pages in memory in discontiguous areas that are available to be written into and sets up a transfer of information to the first page in the list via the controller. When the boundary or end of the first page is reached, the controller so advises the host and the host then provides the controller with the address of the second page, if it be discontiguous with said first page. This procedure continues until all of the information is stored in memory. It is readily apparent from the above that, after each page is stored in memory, storage temporarily ceases if the next page is discontiguous while the host is informed by the controller that the end of a page has been reached and the host then provides the controller with the address of the next page to be stored in memory and the number of transfers on that page. This procedure on a page by page basis is time consuming. The desire is to record information in discontiguous storage locations of memory in minimum time and with minimum disturbance of the host computer.

SUMMARY OF THE INVENTION

In accordance with the present invention, information is stored on a page by page basis in memory in discontiguous locations therein with the address of the next page in which storage is to take place always being available in the controller to minimize delay in storage from the end of one page to the beginning of the following page, regardless of page location in memory. All of the information relative to the addresses of the discontiguous storage locations in memory is provided to the controller by the host computer in a single command rather than after each move to a discontiguous storage location. All jumps to discontiguous storage locations are then performed independent of the host computer.

The host, in one command, provides the entire page number list. Typically, a user will make a request for storage space in memory and, when that request comes up, the amount of memory required is determined and the host looks to see where it can obtain that memory and passes that information to the controller. The controller then makes the transfer based upon those pages that have been allocated by the host. The controller looks at the ten low order bits of the twenty-one bit host address and, when those ten low order bits are ones, the controller knows that it is about to cross a page boundary. At that time, the controller determines the address of the next physical page to which the transfer of information should continue by storing these physical page numbers in its own local memory. When the controller sees there are all ones in the ten low order bits of the address, it stops transferring at that point, loads the new page number into the high order eleven bits and sets the low order ten bits to zero and effectively is able then to transfer data to the discontiguous pages without any interruption by the host processor.

DESCRIPTION OF THE PREFERRED EMBODIMENT

Referring now to FIG. 1, there is shown the memory mapping system in accordance with the present invention.

The memory address has twenty-one bits divided into ten low order and eleven high order bits. The eleven high order bits represent the page and the ten low order bits represent the offset within the page. The controller receives a list of page numbers from the host which is a list of eleven bit pages that is sent to the controller at the beginning of the transfer. In addition to the page numbers, the controller is given a starting address which is a twenty-one bit address which is a page number and an initial starting point on the page. The controller then starts transferring information at the starting address until it gets to a page boundary. The controller now knows it has to cross a page so it stops transferring there, loads the first stored eleven bit entry into the high order eleven bits of a counter and sets the low order bits of the counter to zero. The controller has a physical address equal to the first eleven bit entry and all zeroes in the low order bit locations and its starts transferring information into memory at that point and the low order bits keep counting up until they are all ones, at which time the end of the page is reached. In that way, the controller transfers information to pages which are scattered all over physical memory.

Figure 1A:
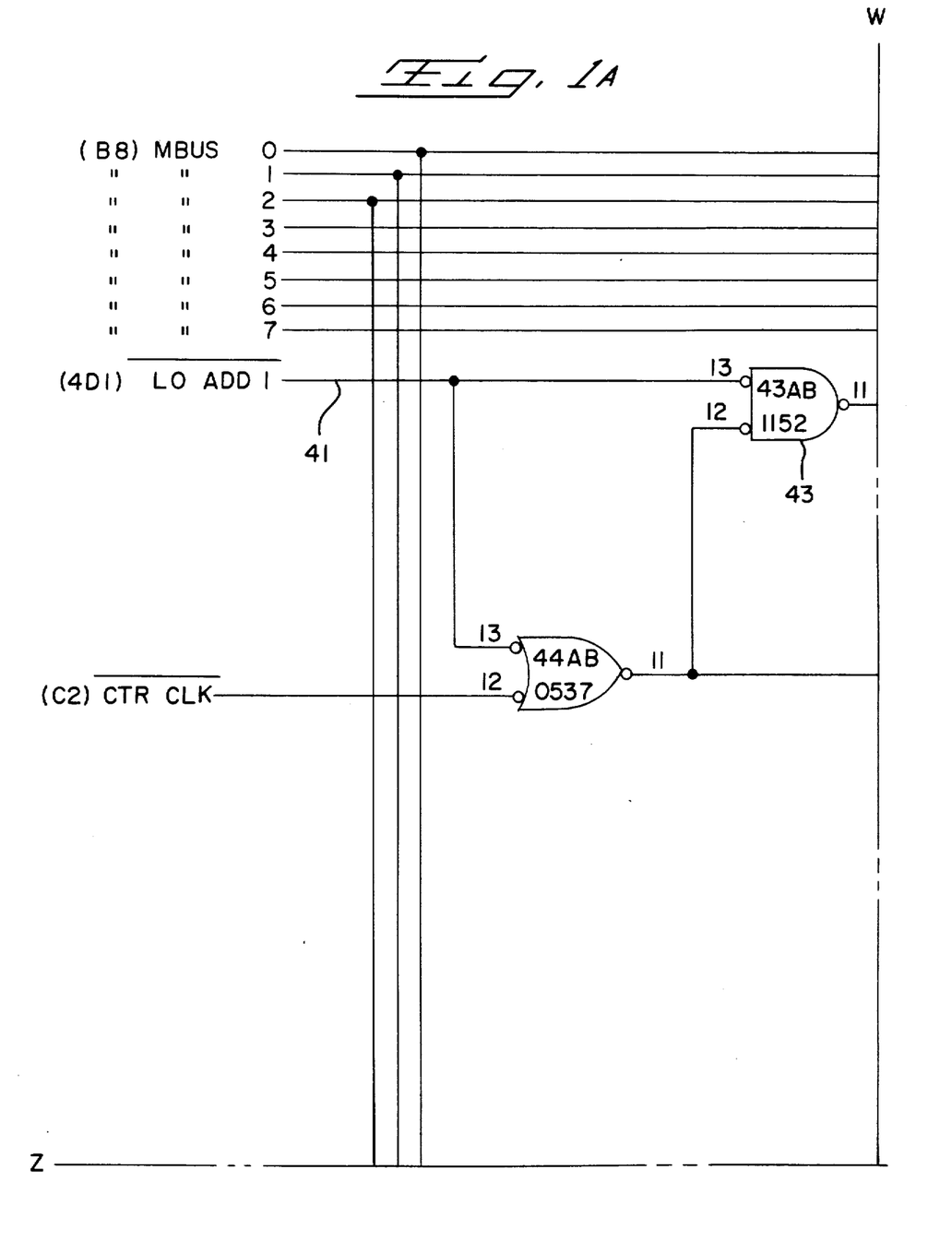
FIG. 1 is a circuit diagram of the memory mapping system in accordance with the present invention.
Figure 1B:
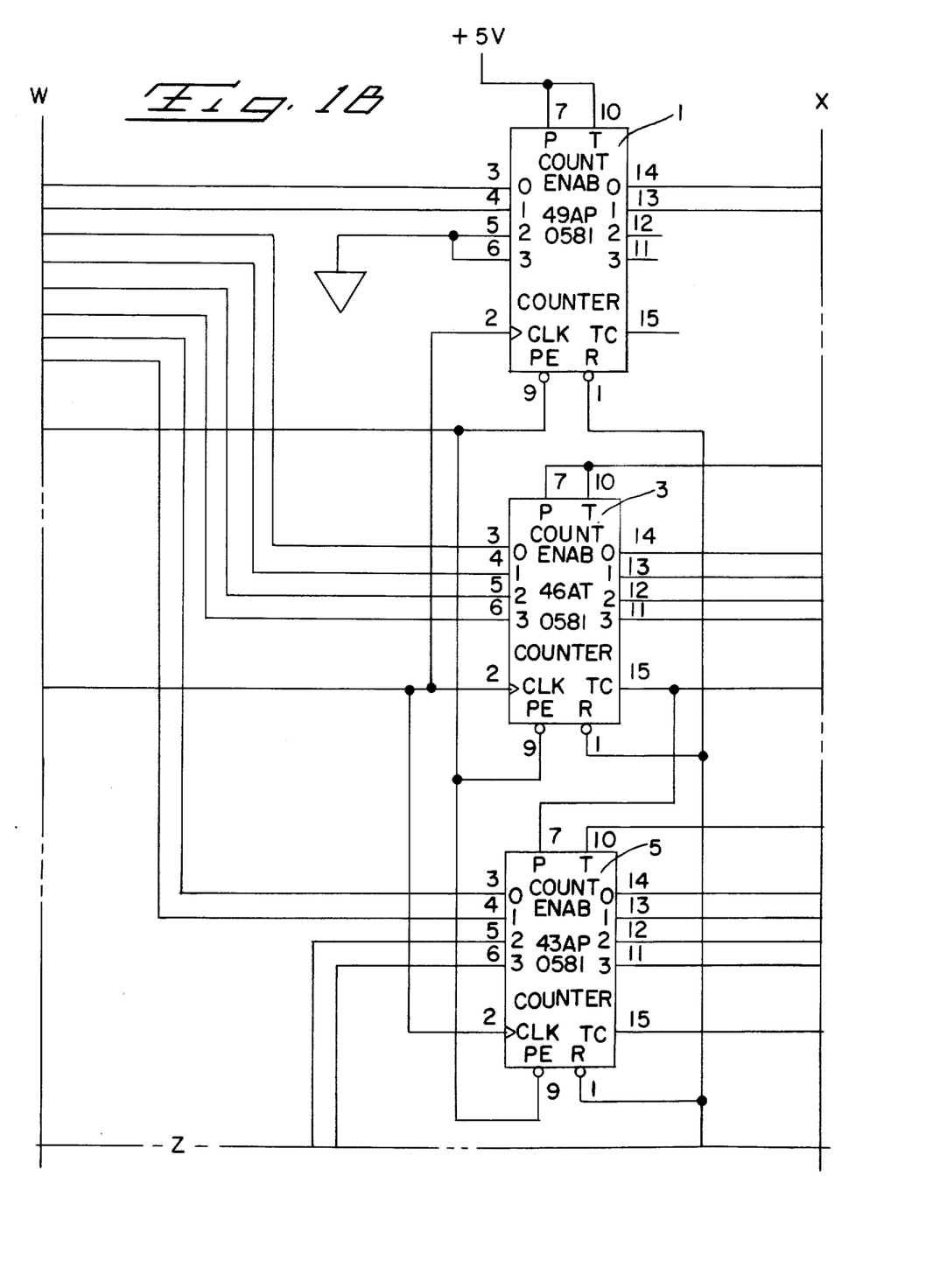
Figure 1C:
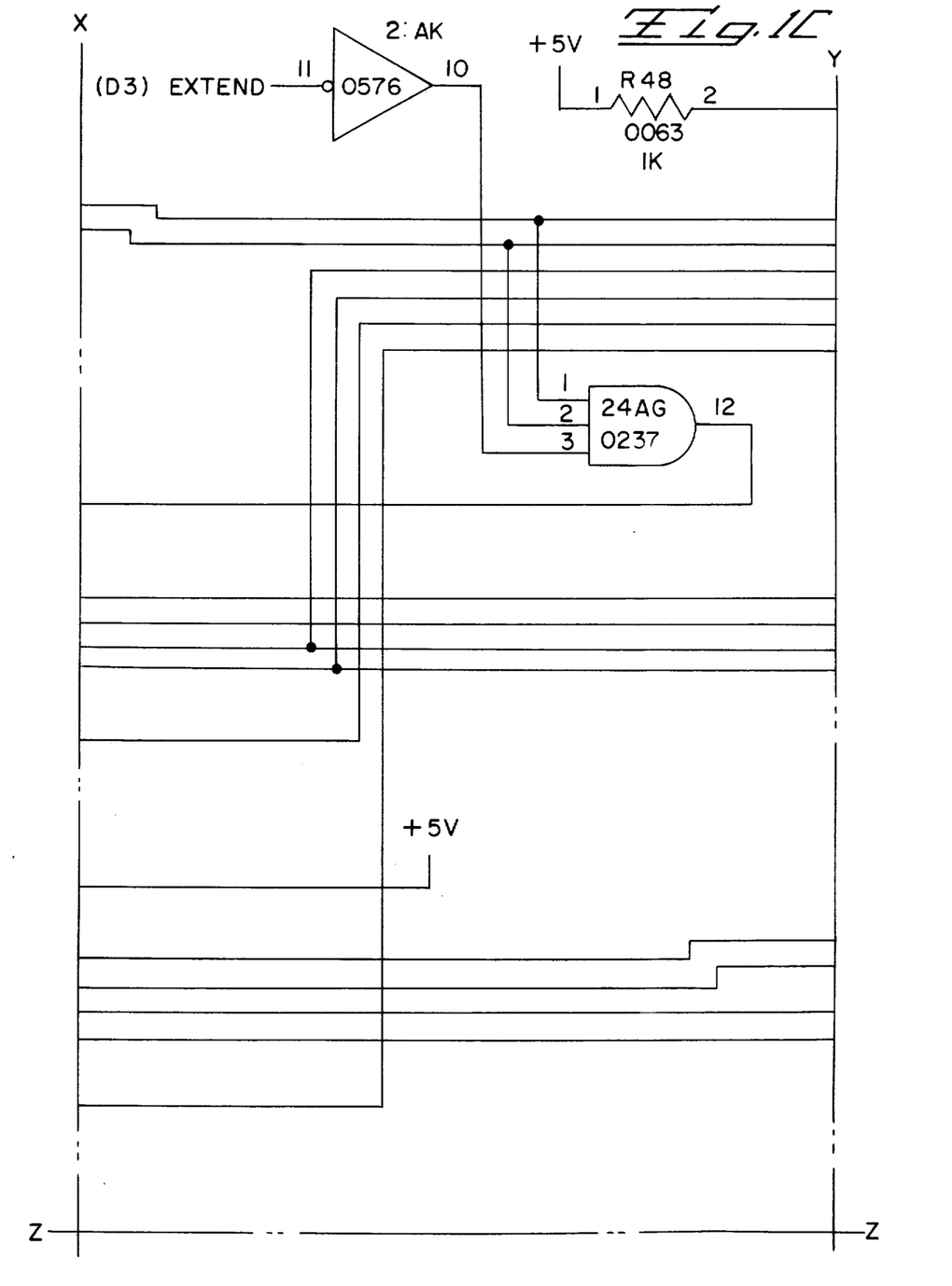
Figure 1E:
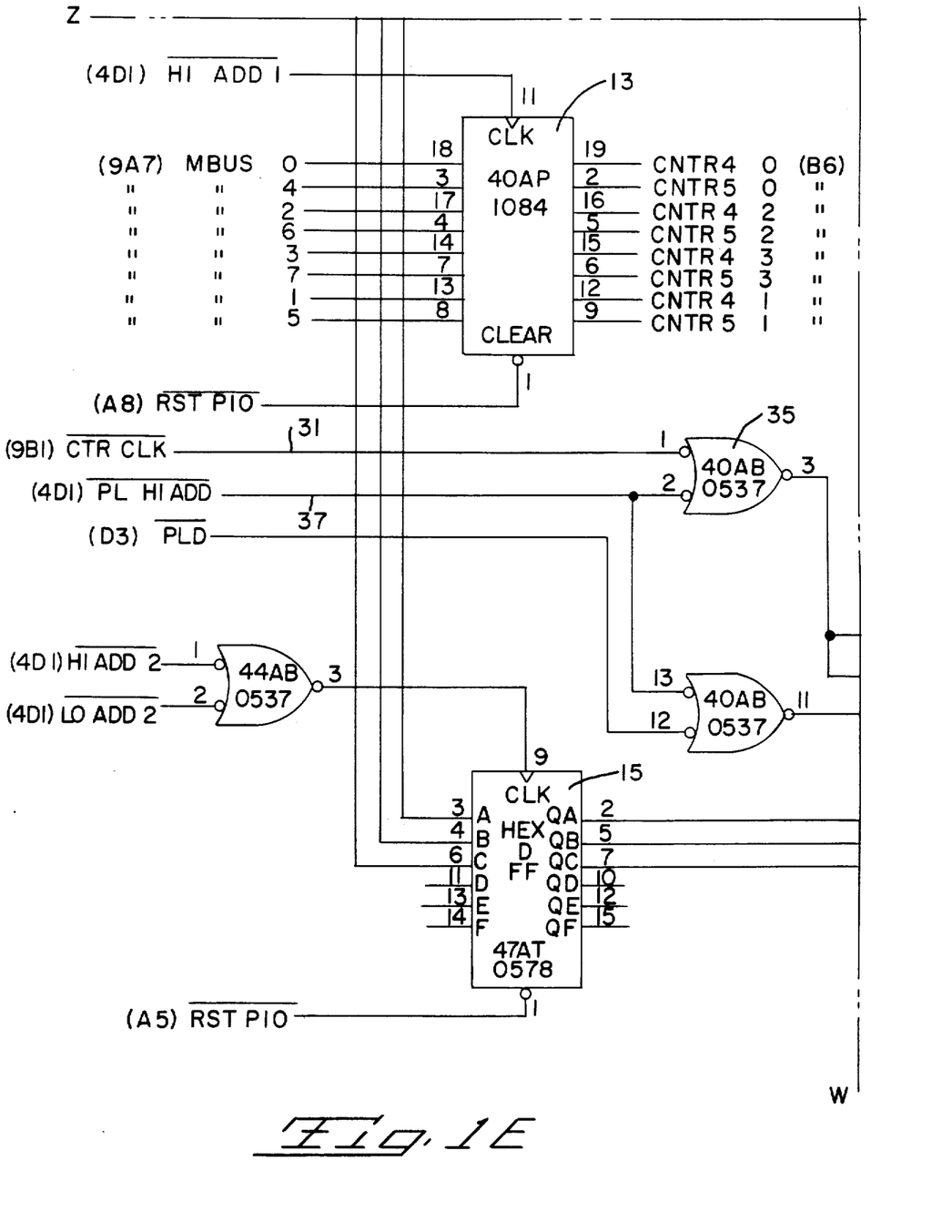
Figure 1F:
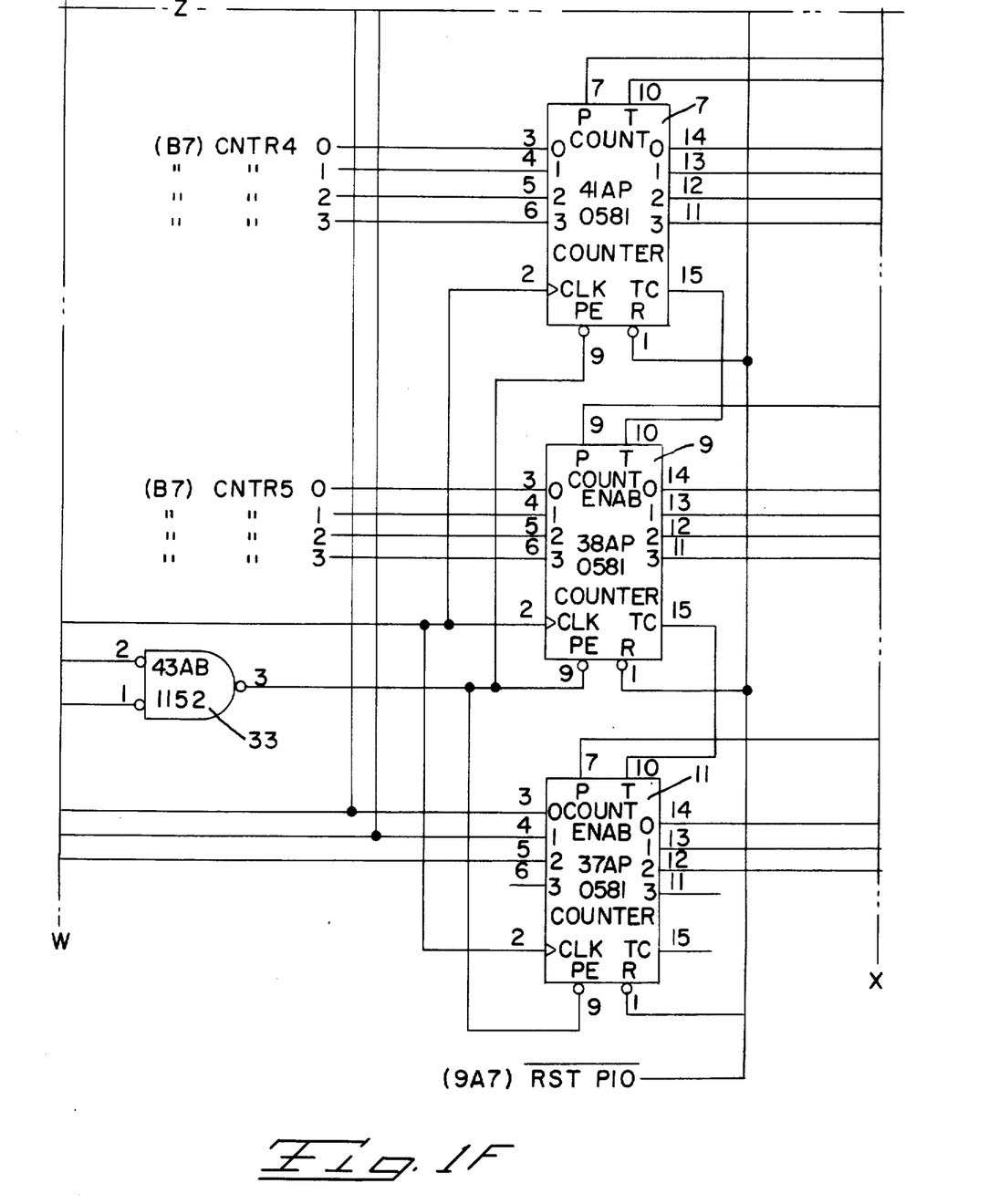
Figure 1H:
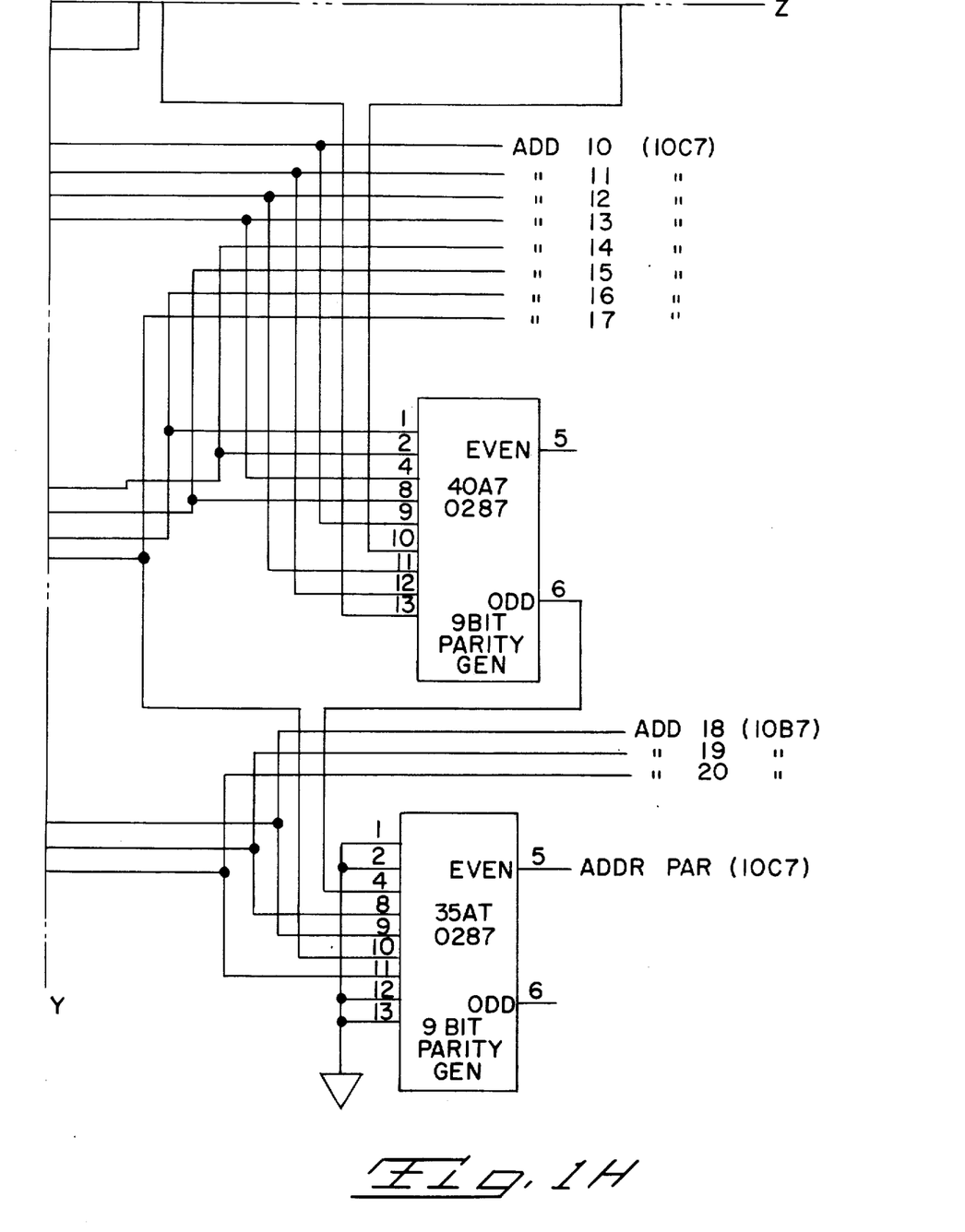

Looking at FIGS. 1A-1H together, the circuitry for accomplishing the above includes a series of counters 1, 3, 5, 7, 9 and 11 (FIGS. 1B and 1F). The outputs from these counters marked ADD 0 to ADD 20 (FIGS. 1D and 1H) form the twenty-one bit address mentioned above. The ten low order bits, ADD 0 to ADD 9 indicate the offset in the page number and the remaining bits, ADD 10 to ADD 20 provide the page number. A pair of registers 13 and 15 (FIG. 1E) is provided to store the next eleven bit page number in memory into which information is to be stored when storage on the page then in use is completed.

In operation, the twenty-one bit address is loaded into the counters 1 through 11 via lines marked MBUS(X), these busses being input lines from a microprocessor in the controller (not shown), the ten low order bits being loaded directly into counters 1, 3 and 5 by the controller (not shown) and the eleven high order bits being loaded into counters 7, 9 and 11 via registers 13 and 15. Then an eleven bit page number is loaded into registers 13 and 15. In this manner, the counters have been loaded with the starting page number and the offset on that page and the registers have been loaded with the page number of the succeeding page in memory in which storage is to take place when the page number loaded into the counter is full.

Storage now takes place under control of a clock which counts up the low order bits in counters 1, 3 and 5 for each word transfer until those counters contain all ones for the ten low order address bits. This condition is noted at output 17 labelled PG LEN ALL 1 (9B6) of PROM 19 (FIG. 1D), the PROM 19 continually testing the ten low order bits at the outputs of counters 1, 3 and 5 to determine when an all ones condition exists in these ten low order bits. Upon sensing the all ones condition, a signal is sent on line 9B6 to indicate to circuitry (not shown) that the next page number should be loaded into registers 13 and 15.

Figure 2:
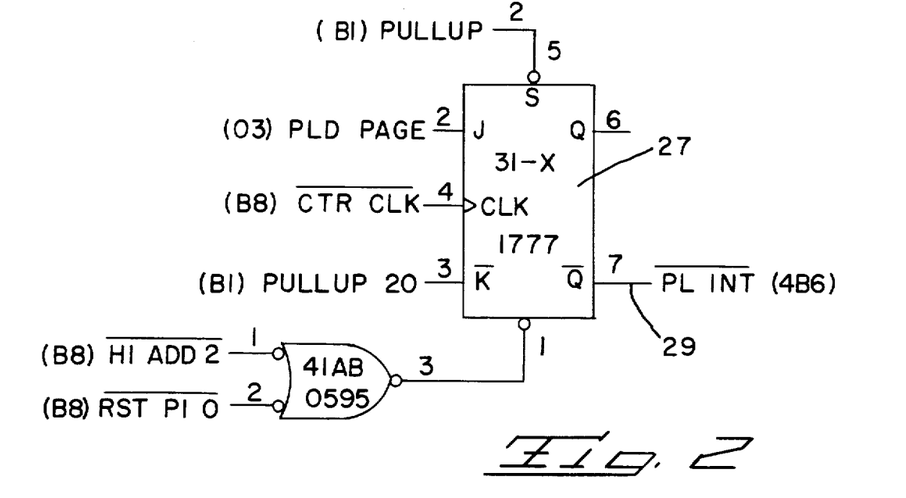
FIG. 2 is a block diagram of a flip-flop.
Figure 3:
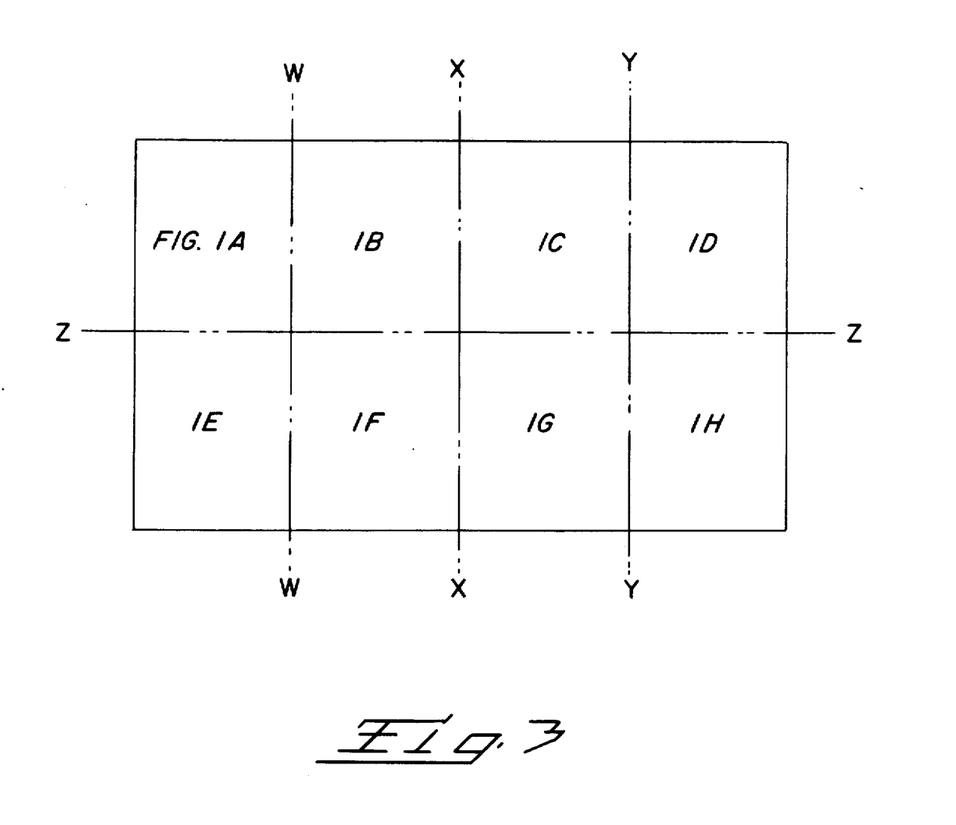
FIG. 3 is a map showing the arrangement of FIGS. 1A through 1H.

At the time when PROM 19 recognizes an all ones condition, the output 21 therefrom labelled $\overline{\text{PLD}}$ becomes active and provides an input signal to gate 23 (FIG. 1E) and sets up the condition on the counters 7 through 11 in conjunction with the clock input on line 31 labelled $\overline{\text{CTR CLK}}$ to make OR gates 35 (FIG. 1E) active and thereby make AND gate 33 (FIG. 1F) active to cause loading of the next page number into the counters. Also, the output 25 labelled PLD PAGE becomes active and causes the flip-flop 27 (FIG. 2) to be set and make the output 29 thereof labelled PL INT (page load interrupt) active, this causing the microprocessor in the controller (not shown) to load the next address into registers 13 and 15. On the next clock pulse, the next page number is therefore transferred from the registers 13 and 15 to the counters 7, 9 and 11 to provide a new set of eleven high order bits therein and provides the ability to jump directly to the next page of memory to be used, whether or not contiguous to the prior page. Also, simultaneously, the ten low order bits in the counters 1, 3 and 5 are reset to all zeros. It should be noted that the ten low order bits need not be reset to all zeros, the all zero reset being provided by way of example. The eleven bit high order address of the following page, which has been previously provided to the controller by the host computer and is stored in the controller, is also then stored in the registers 13 and 15 and the prior page number is erased. The cycle is then repeated until all pages provided by the host computer to the controller have been used.

With reference to registers 13 and 15, the input 37 to gate 35, listed as $\overline{\text{PL H1 ADD}}$ is for the purpose of loading the initial address directly into the counters 7, 9 and 11 via the registers 13 and 15.

Similarly, the $\overline{\text{LO ADD 1}}$ signal 41 at gate 43 (FIG. 1A) is for the purpose of loading the initial starting location on the initial page into counters 1, 3 and 5.

The parity circuit 39 is of no concern with regard to the invention herein.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A system for transferring a block of information into a first memory, said system comprising:
   (i) a second memory;
   (ii) a host computer, operatively connected to said first memory, having
      (a) means, operatively connected to said first memory, for identifying regions of said first memory which are available for storing at least part of said block of information,
      (b) means, connected to said identifying means, for selecting, from said regios identified by said identifying means, a set of regions to receive said block of information, and
      (c) means, connected to said selecting means, for creating a list of the initial address of each region in said set of regions;
   (iii) a controller, operatively connected to said first memory, said second memory and said host computer, said controller having
      (a) means for receiving said list from said host computer;
      (b) means, connected to said receiving means, for storing said list in said second memory;
      (c) means for retrieving individual initial addresses from said list stored in said second memory;
      (d) means, responsive to the output of said address retrieval means, for providing the addresses in said first memory at which said information is to be stored;
      (e) means, responsive to the output of said address providing means, for transferring the information into said first memory;
      (f) means, connected to said means for providing the addresses and operative during the transferring of the information into said first memory, for identifying when the region of said first memory into which the information is being stored is full; and
      (g) means, responsive to the output of said full region identifying means, for causing said address retrieval means to retrieve the address of another region from said list in said second memory.

2. The system of claim 1, wherein the address providing means comprises;
   counter means; and
   clock signal means, connected to the clocking input of said counter means, for incrementing the outputs of said counter means during the transferring of said block of information.

3. The system of claim 2 wherein the counter means comprises:
   a first counter portion for providing the initial address of the region in which the information transfer is occurring,
   a second counter portion for providing the address within the region into which the information is being transferred, and
   means for providing said clocking input to said first counter portion only at such times as a new region address is being provided to said counter means from said second memory.

4. The system of claim 2 wherein said full region identifying means comprises:
   means, connected to the output of said counter means, for detecting the presence at the output of a predetermined count indicating that the region is full, and means, operatively connected to said count detecting means, for generating an output signal to said causing means for when said predetermined count is detected by said count detecting means.

5. A method of storing a block of information in a first memory, said first memory having a plurality of storage regions available for storing at least part of the block of information and a plurality of storage regions unavailable for storing any part of the block of information, said method comprising the steps of:
   (a) determining the amount of memory storage area in said first memory required to contain said block of information;
   (b) selecting a set of regions from said plurality of regions available for storing at least part of the block of information, the combined memory storage area of the selected set of regions being at least as large as the memory storage area required to store said block of information;
   (c) storing, in a second memory means, a list of the initial addresses of said selected set of regions;
   (d) retrieving, from said second memory means, the first entry on said list;
   (e) initiating storage of said block of information in said first memory means, beginning at the retrieved address;
   (f) monitoring the available storage area in the region into which said block of information is being transferred;
   (g) if the region into which said block of information is being transferred becomes full prior to completion of the storage of the block of information,
      (1) retrieving the next entry from said list, and
      (2) continuing the storage of said information, beginning at the address identified by said retrieved next entry; and
   (h) repeating step (f) and (g) until the storage of the entire block of information has been completed.

6. A method of storing a block of information in a first memory, said first memory having a plurality of regions available for storing at least part of the block of information and a plurality of storage regions unavailable for storing any part of the block of information, said method comprising the steps of:
   (a) determining the amount of memory storage area required to contain said block of information;
   (b) selecting a set of regions from said plurality of regions available for storing at least part of the block of information, the combined memory storage area of the selected set of regions being at least as large as the memory storage area required to store said block of information;
   (c) storing, in a second memory means, a list of the initial addresses in said first memory means of said selected set of regions;
   (d) storing, in said second memory means, a list of starting point addresses, each starting point address in said starting point list being associated with one of the regions in said selected set of regions and indicating an address within said associated region;
   (e) retrieving, from said second memory means, the first entry on said list of addresses of said selected set of regions
   (f) retrieving, from said second memory means, the entry from said list of starting point addresses associated with the entry retrieved in step (e);
   (g) initiating storage of said block of information in said first memory means, beginning at at the address indicated by the entries retrieved in step (e) and (f);
   (h) monitoring the available storage area in the region into which said block of information is being transferred;
   (i) if the region into which said block of information is being transferred becomes full prior to completion of the storage of the block,
      (1) retrieving the next entry from said list of addresses of selected regions,
      (2) retrieving the associated entry from said list of starting point addresses, and
      (3) continuing the storage operation, beginning at the address identified by the entries retrieved in steps (i) (1) and (i) (2), and
   (j) repeating step (h) and (i) until the storage of the block of information has been completed.

* * * * *